United States Patent
Robertson (10) Patent No.: US 7,249,865 B2
(45) Date of Patent: Jul. 31, 2007

(54) COMBINATION FLUORESCENT AND LED LIGHTING SYSTEM

(75) Inventor: Jonas Robertson, Harvey, LA (US)

(73) Assignee: Plastic Inventions and Patents, Saint-Laurent (CA)

( * ) Notice: Subject to any disclaimer, the term of this patent is extended or adjusted under 35 U.S.C. 154(b) by 0 days.

(21) Appl. No.: 11/219,766

(22) Filed: Sep. 7, 2005

(65) Prior Publication Data

US 2007/0053182 A1    Mar. 8, 2007

(51) Int. Cl.
*F21V 21/00* (2006.01)
*F21S 9/00* (2006.01)

(52) U.S. Cl. .................. 362/228; 362/229; 362/260

(58) Field of Classification Search ............ 362/228, 362/230, 231, 229, 800, 260, 396; 313/512
See application file for complete search history.

(56) References Cited

U.S. PATENT DOCUMENTS

| | | | |
|---|---|---|---|
| 2,713,629 A | 7/1955 | Etzkorn | |
| 3,714,414 A | 1/1973 | Sternius | |
| 3,755,663 A | 8/1973 | George, Jr. | |
| 4,152,618 A | 5/1979 | Abe et al. | |
| 4,521,835 A | 6/1985 | Meggs et al. | |
| 4,581,687 A | 4/1986 | Nakanishi | |
| 4,665,470 A | 5/1987 | George, Jr. | |
| 4,748,545 A | 5/1988 | Schmitt | |
| 4,901,207 A | 2/1990 | Sato et al. | |
| 4,941,072 A | 7/1990 | Yasumoto et al. | |
| 4,943,900 A | 7/1990 | Gartner | |
| 5,032,960 A | 7/1991 | Katoh | |
| 5,515,253 A | 5/1996 | Sjobom | |
| 5,688,042 A | 11/1997 | Madadi et al. | |
| 5,810,463 A | 9/1998 | Kawahara et al. | |
| 6,068,383 A | 5/2000 | Robertson et al. | |
| 6,139,174 A | 10/2000 | Butterworth | |
| 6,283,612 B1 | 9/2001 | Hunter | |
| 6,331,915 B1 | 12/2001 | Myers | |
| 6,388,393 B1 | 5/2002 | Illingworth | |
| 6,583,550 B2 | 6/2003 | Iwasa et al. | |
| 6,682,205 B2 | 1/2004 | Lin | |
| 6,860,628 B2 | 3/2005 | Robertson et al. | |
| 6,908,220 B2 * | 6/2005 | Misawa et al. | 362/541 |
| 6,932,492 B2 * | 8/2005 | Tumlinson et al. | 362/228 |
| 2002/0060526 A1 | 5/2002 | Timmermans et al. | |
| 2006/0007682 A1 * | 1/2006 | Reiff et al. | 362/253 |
| 2006/0203465 A1 * | 9/2006 | Chang et al. | 362/29 |
| 2006/0203493 A1 * | 9/2006 | Brower et al. | 362/297 |

\* cited by examiner

*Primary Examiner*—Thomas M. Sember
(74) *Attorney, Agent, or Firm*—Merek, Blackmon & Voorhees, LLC (57) ABSTRACT

LEDs can be added to a conventional fluorescent lighting fixture by providing an LED circuit to the fluorescent lighting fixture pan, by adding LEDs to the fluorescent light tube with an indentation in the light tube rear to receive an LED to influence the apparent color of the the fluorescent light, or by adding an LED to either end cap of the fluorescent light tube to shine down the tube from the interior, added as an add-on band which could clip onto the tube, and could also include a circuit board based LED attached to the rear of the tube and alternatively have LED lighting within a charged fluorescent tube.

21 Claims, 7 Drawing Sheets

COMBINATION FLUORESCENT AND LED LIGHTING SYSTEM

FIELD OF THE INVENTION

The present invention relates to a fluorescent lighting fixture having a fluorescent light tube in combination with light emitting diodes (LEDs) to provide various illumination devices for various lighting and signaling purposes.

BACKGROUND OF THE INVENTION

Fluorescent lighting is commonly used in offices and commercial venues. Fluorescent lighting operates according to the principle of ionizing a gas contained within a sealed tube. The electrically excited gas produces light emission as it returns to its normal energy level. The light spectrum depends upon the type of gas within the tube, but conventional fluorescent lighting emits light in the ultraviolet spectrum which is converted to visible light as it encounters the coating within the tube and causes the coating to fluoresce. Such fluorescent lighting also requires a relatively high voltage to produce the required ionization of the gas. This voltage may be provided by a starter which provides an inductive kick when current is shut off or reversed, the ballast serving to limit current in the arc between the filaments, or by high voltage windings loosely wound on the ballast itself in rapid start fluorescent lights.

Fluorescent lighting systems, while being more efficient than incandescent lighting, still consume considerably more energy than LED lights. Further, it has become common in office buildings and security installations to have the lighting system operating twenty-four hours a day which results in even more energy usage. It has been proposed for example in U.S. Pat. Nos. 6,583,550 and 6,860,628 to provide LEDs within the fluorescent tube to create a combination fluorescent/LED light source. However, these devices do not exploit many additional advantages of combining LED light sources with conventional fluorescent light fixtures. LEDs provide many advantages in lighting, where they may be employed. LEDs are relatively cool in operation, and do not produce any significant amount of heat as a by product of their operation. Moreover, they are quite efficient in comparison to other types of lighting principles. LEDs are available in a number of different colors, and the lighting intensity may be varied by means of a simple variable resistor or rheostat, unlike fluorescent lighting.

OBJECTS AND SUMMARY OF THE INVENTION

An object of the invention is to provide a fluorescent light fixture having an LED lighting system.

Another object of the invention is to provide an LED lighting system which is removably connectable to a fluorescent light tube.

Yet another object of the invention is to provide an LED lighting system which is remotely controllable.

Still another object of the invention is to provide an LED lighting system which can be operated with a fluorescent lighting fixture to affect the color of the light emitted from the fixture.

Yet another object of the invention is to provide LEDs mounted on a clip for removable attachment to a fluorescent tube.

Still another object of the invention is to provide a circuit board LED system for a fluorescent light system.

Yet another object of the invention is to provide an LED light assembly inside of a fluorescent light tube.

These and other objects of the present invention will be readily apparent upon review of the following detailed description of the invention and the accompanying drawings. These objects of the present invention are not exhaustive and are not to be construed as limiting the scope of the claimed invention.

In summary, LEDs can be added to a conventional fluorescent lighting fixture by providing an LED circuit to the fluorescent lighting fixture pan, by adding LEDs to the fluorescent light tube with an indentation in the light tube rear to receive an LED to influence the apparent color of the the fluorescent light, or by adding an LED to either end cap of the fluorescent light tube to shine down the tube from the interior, added as an add-on band which could clip onto the tube, and could also include a circuit board based LED attached to the rear of the tube and alternatively have LED lighting within a charged fluorescent tube.

With these and other considerations in mind, as will become apparent hereinafter, the invention includes certain novel features of construction, combination and arrangement of parts and portions as will be set forth in the appended claims, reference being had to the accompanying drawings and detailed description thereof.

DETAILED DESCRIPTION OF THE PREFERRED EMBODIMENTS

Fluorescent lighting systems, while being more efficient than incandescent lighting, still consume considerably more energy than LED lights. Combining LED lighting with conventional lighting allows for modification of conventional fluorescent lighting by adding color or additional brightness when both the fluorescent lighting and LED lighting are used together. However, it has become common in office building and security installations to have the lighting system operating twenty-four hours a day. Thus, the use of LED lighting as security lighting during off-working hours can result in substantial energy savings. The present invention also includes the electrical componentry required to adapt the operation of an LED array to the electrical system of a fluorescent lighting fixture, with such electrical componentry being provided either internally within the replacement lighting unit or externally, as desired. The present system may bypass the ballast and starter components of the conventional fluorescent circuit, and may also make advantageous use of a rheostat or other signal control circuitry to control the light and/or color output of the LED device, as desired. The LEDs can also be used to provide signals to personnel. For example, a flashing strobe effect could be provided to warn personnel in an emergency situation. Another option is to use various colors to indicate emergency conditions such as fires, weather warnings, building lockdowns, bomb threats or even terrorist threat levels. In order to provide this signaling function, a signaling circuit is associated with the LED lighting system. The signaling circuit could be hard wired for remote control or could be wirelessly controlled.

Now the various embodiments of the invention will be described with respect to the drawings.

Figure 1:
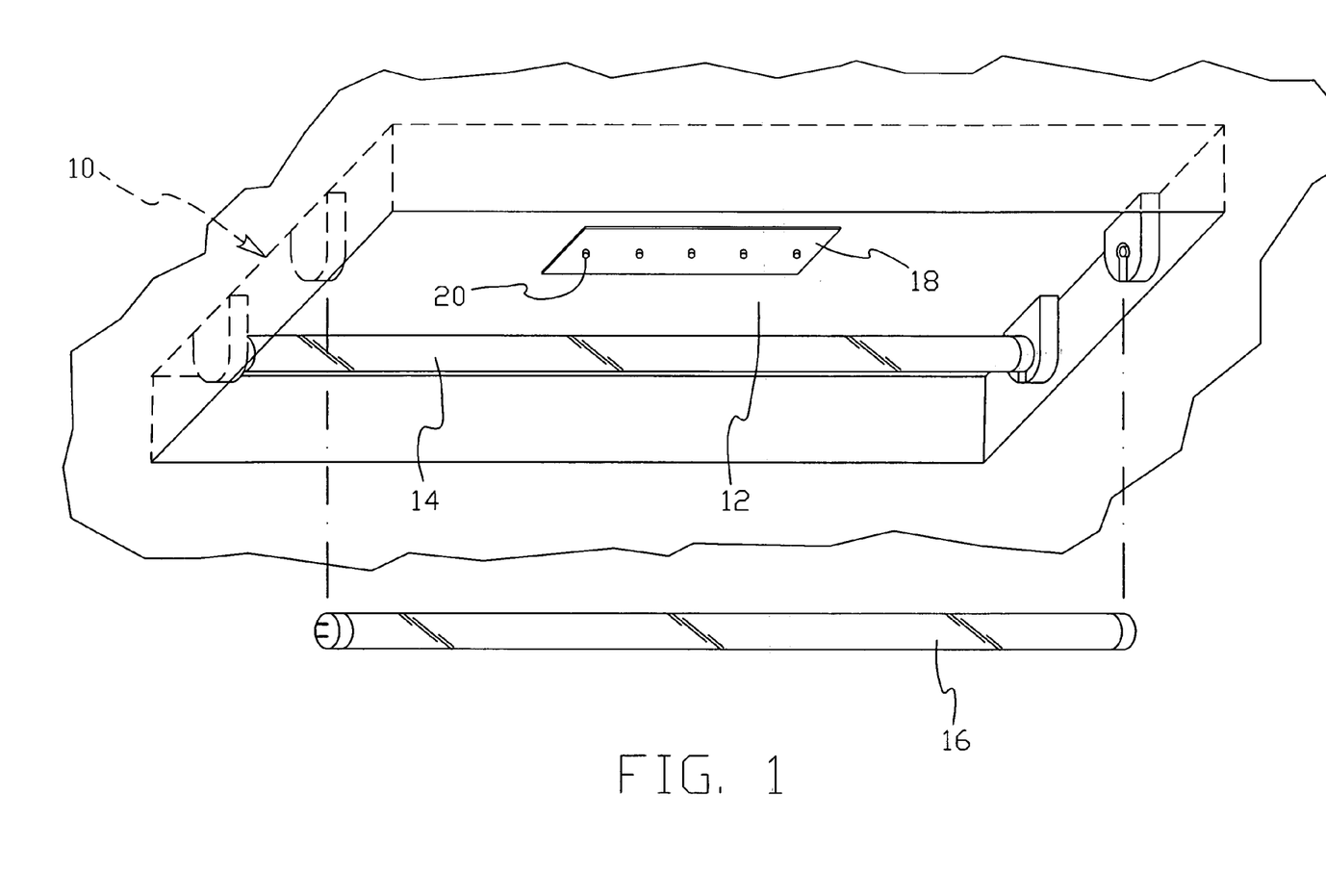
FIG. 1 is a perspective view showing the installation of an LED in the pan of a fluorescent light fixture.

FIG. 1 shows a lighting fixture 10 having a pan 12, a pair of fluorescent tubes 14 and 16 with tube 16 removed to reveal an LED lighting assembly 18 added to the pan 12. The lighting fixture 10 is connected to conventional electric wiring to supply power to both the fluorescent tubes 14 an well as 16 as well as LED lighting assembly 18 having one or more LEDs 20. The LED lighting assembly 18 may be operable in conjunction with the fluorescent tubes 14 and 16 to enhance the brightness of the light from the fixture 10 or may have colored LEDs 20 to affect the color of the light emanating from the lighting fixture 10. Alternatively, the LED lighting assembly 18 may also be operated independently of the fluorescent tubes 14 and 16 to provide auxiliary lighting preferably via a signaling circuit housed therein. The auxiliary lighting can provide low energy consumption security lighting during off hours.

Figures 2, 3:
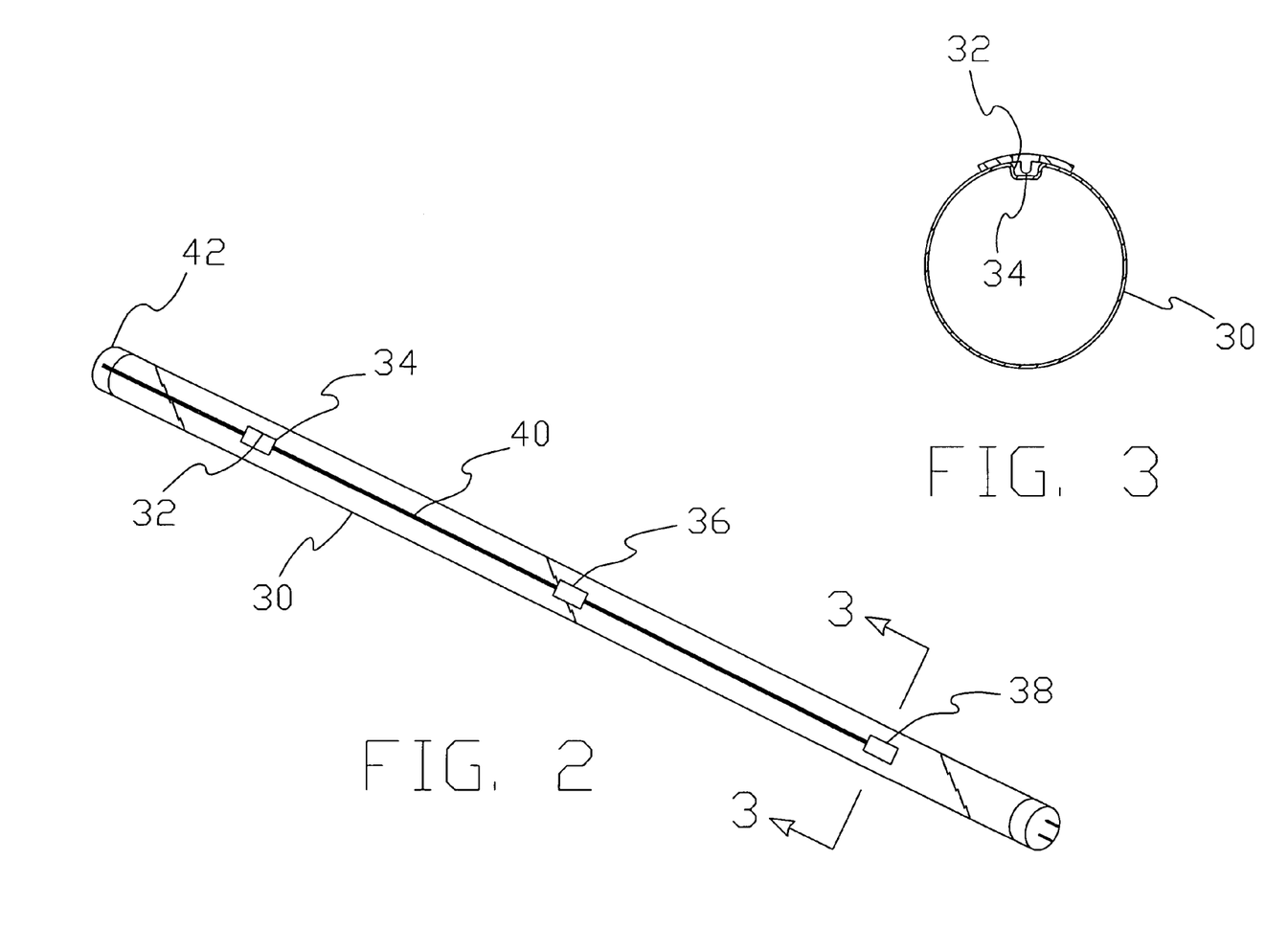
FIG. 2 is a perspective view of a fluorescent tube having indentations for receiving LEDs.
FIG. 3 is a cross-sectional view of the fluorescent tube of FIG. 2 taken along lines 3-3 of FIG. 2.

FIG. 2 shows a fluorescent tube 30 having recesses 32 formed therein for receiving LEDs 34, 36 and 38. FIG. 3 is a cross-sectional view of the fluorescent tube of FIG. 2 taken along lines 3-3 showing LED 34 located in one of the recesses 32. The LEDs 34, 36 and 38 are connected by wires 40 to at least one end 42 of fluorescent tube 30 to provide an electrical connection. Alternatively, the LEDs may be wired to a separate power source to be operable independently of the fluorescent tube 30. The LEDs 34, 36 and 38 can be used in the same manner as the LED lighting system 18 as described in FIG. 1 for emergency signaling and security lighting.

Figure 4:
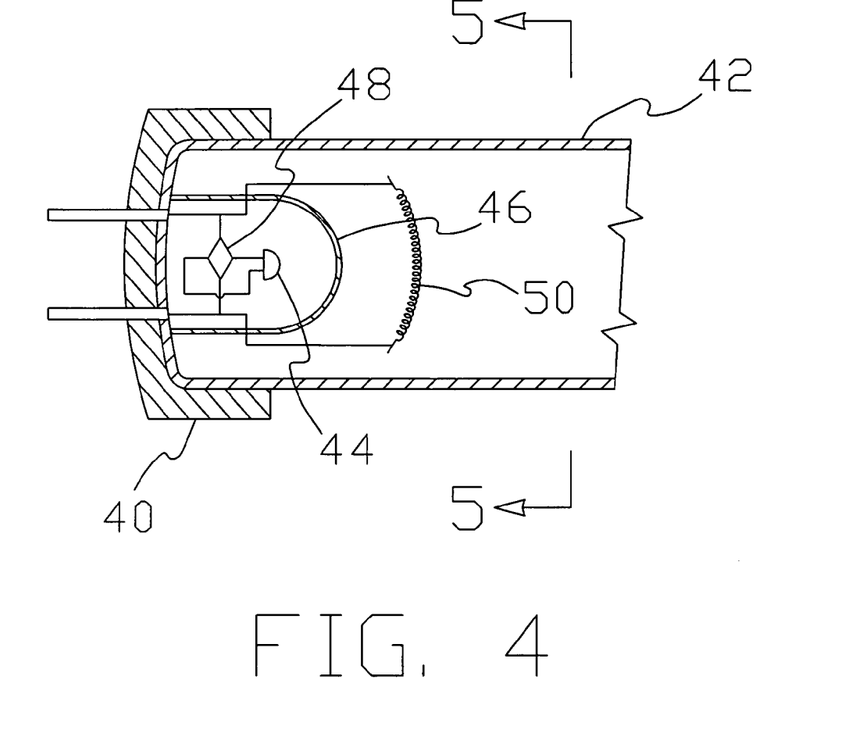
FIG. 4 is a partial sectional view of a fluorescent tube end cap showing LED placement.
Figure 5:
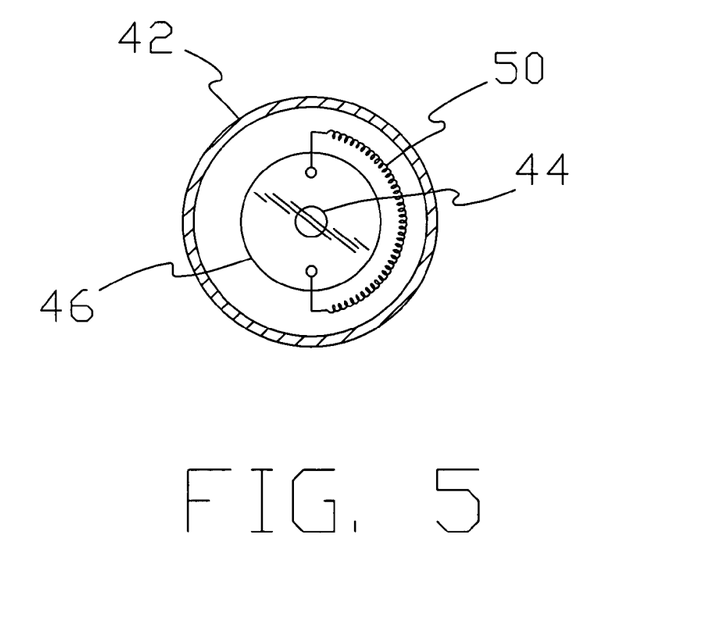
FIG. 5 is a cross-sectional view of the fluorescent tube of FIG. 4 taken along lines 5-5 of FIG. 4.

FIG. 4 show an end cap 40 of a fluorescent tube 42 having an LED 44 located within the end cap 40 and positioned to shine down the tube 42. A transparent housing 46 formed of glass or other suitable material surrounds the LED 44 to separate the LED 44 and its circuitry 48 from the gases within the tube 42. The conventional fluorescent tube electrode 50 is preferably located spaced from the housing 46 a sufficient distance to prevent damage to the LED 44. Use of the LED 44 in this way allows for altering the color of the fluorescent lighting and enhancing the brightness of the fluorescent lighting. FIG. 5 is a cross-sectional view of the tube 42 taken along lines 5-5 of FIG. 4 and showing the interior of end cap 40 including the LED 44, and the filament 50.

Figure 6:
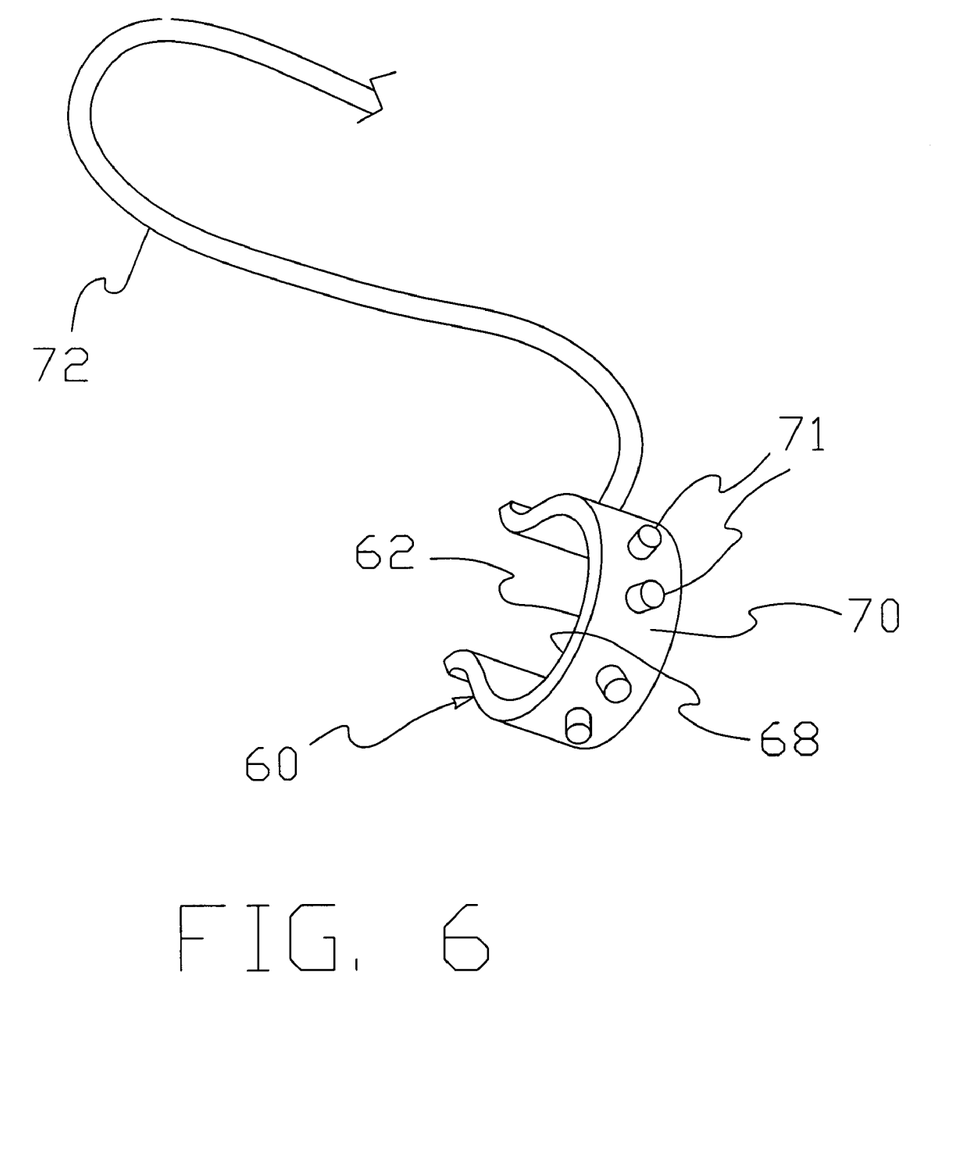
FIG. 6 is a perspective view of a tube clip for connecting LEDs to a fluorescent tube.
Figure 7:
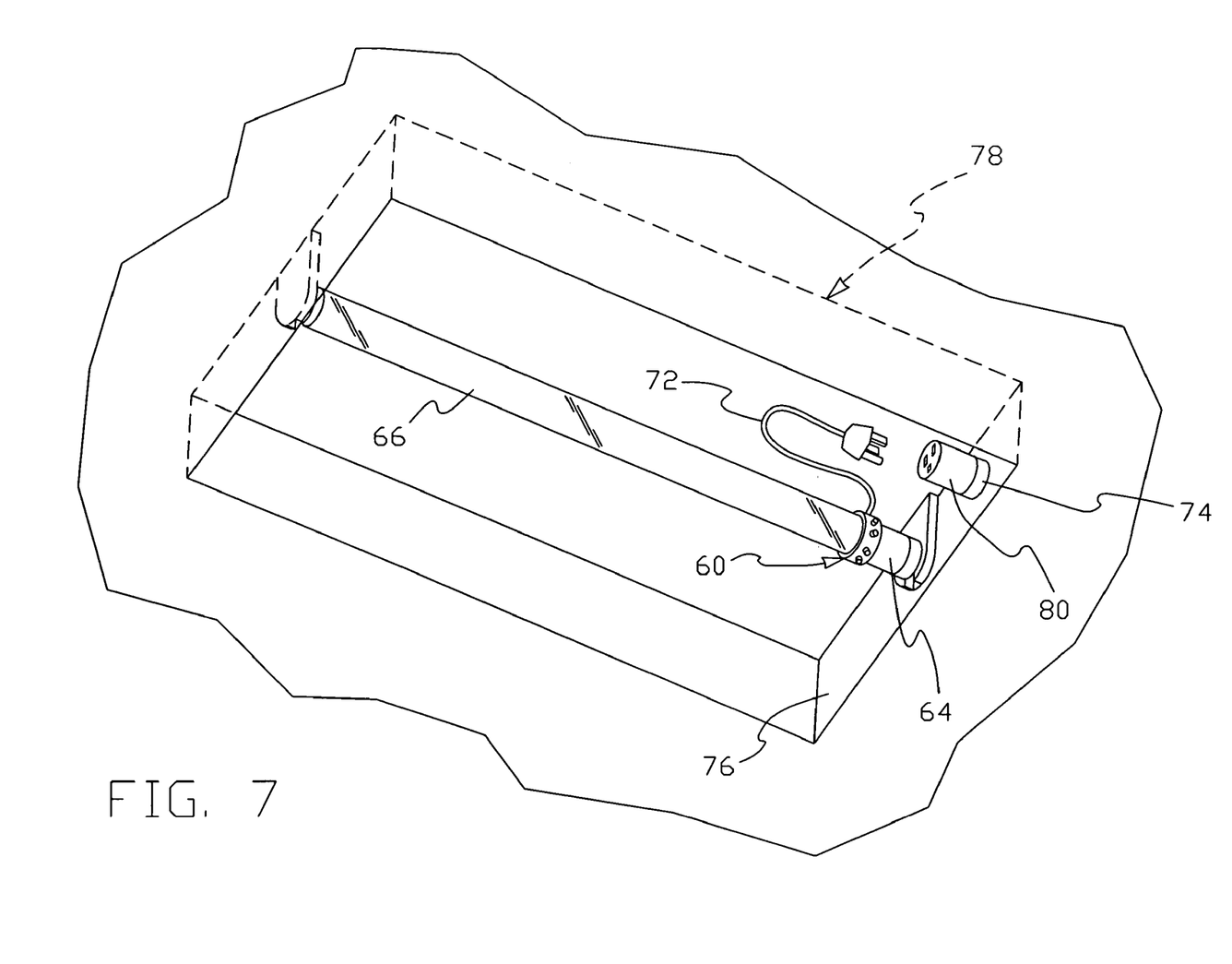
FIG. 7 is a perspective view of the tube clip of FIG. 6 attached to a fluorescent tube.

FIGS. 6 and 7 show a clip 60 formed of an arc 62 of preferably plastic material which can be slipped over end 64 of fluorescent tube 66 and held in a friction fit. The inside surface 68 of the clip 60 may include a scratch resistant coating or alternatively a rubber surface to securely engage the fluorescent tube 66. The size of the clip 60 can vary according to the circumference of the fluorescent tube 66. On the outside surface 70 of the clip 60 is one or more LEDs 71. An electric cord 72 extends from the clip 60 to a power outlet 74 in the wall 76 of fixture 78.

Preferably, the LEDs 71 operate on a 3.6V circuit. A stepdown transformer 80 may be formed as part of the fixture 78 to control the voltage to the LEDs 71.

Figure 8:
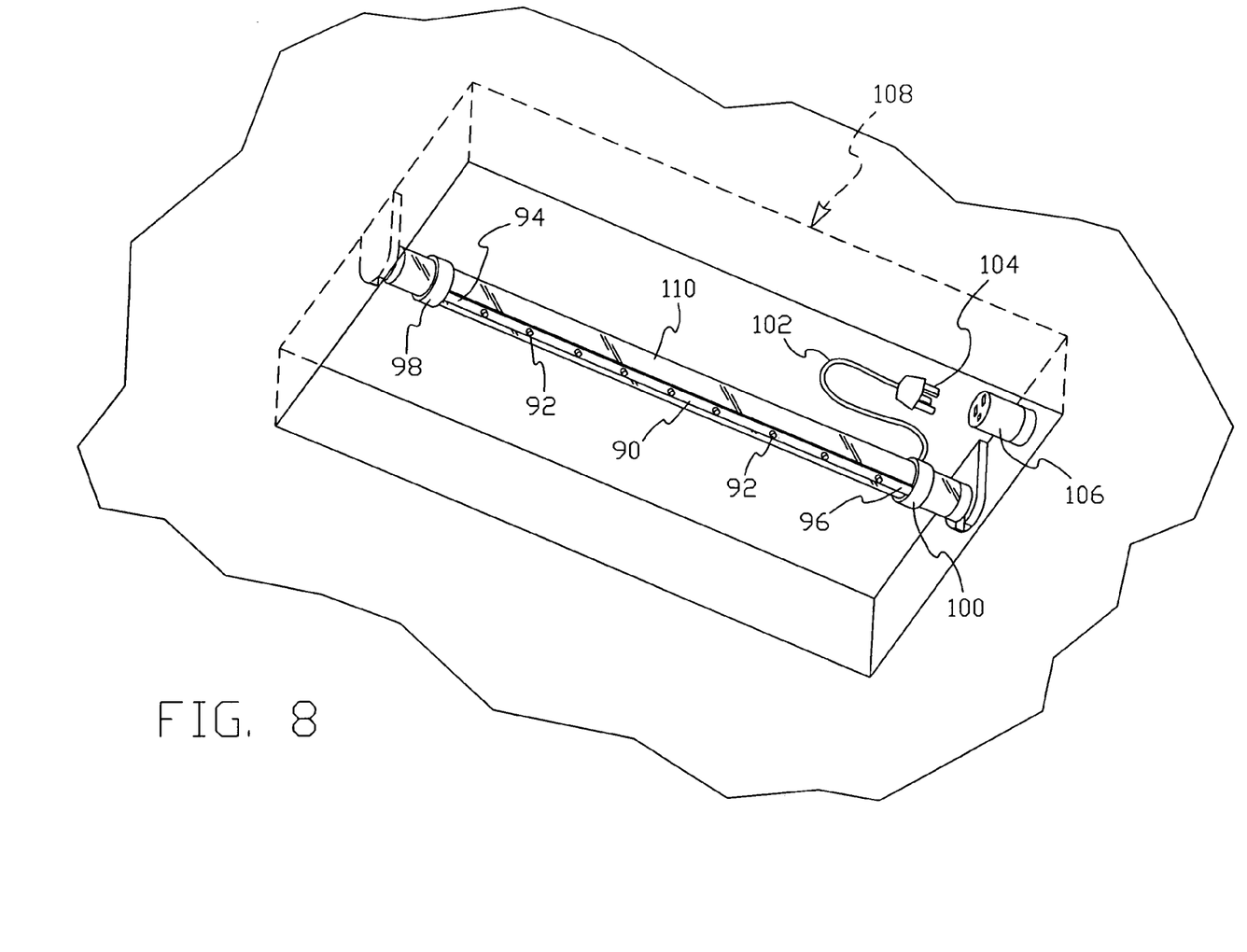
FIG. 8 shows a fluorescent tube having a circuit board LED attached thereto.

FIG. 8 illustrates a circuit board 90 having LEDs 92. The ends 94 and 96 of the circuit board 90 have connectors 98 and 100 which may be clips similar to the clip 60 of FIG. 4. A power cord 102 having a plug 104 connects the circuit board 90 to a power outlet 106 of a fluorescent lighting fixture 108 which may include a voltage control device such as a step-down transformer. Preferably, the connectors 98 and 100 are removable from the fluorescent tube 110 so that the circuit board 90 may be removed from the tube 110 when the tube 110 is replaced.

Figures 9, 10:
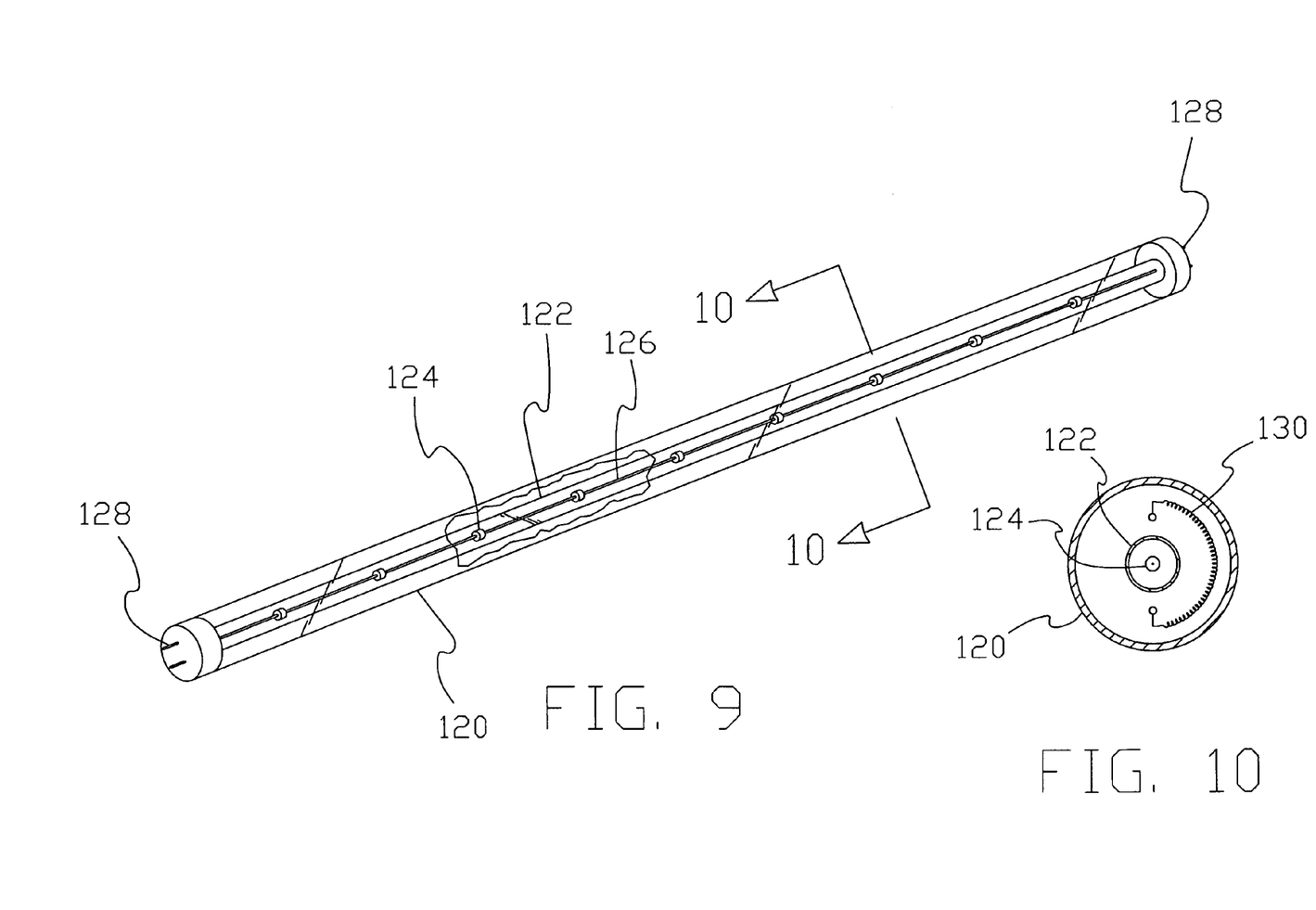
FIG. 9 shows a light assembly with LEDs located inside a fluorescent tube.
FIG. 10 is a cross-sectional view of the light assembly of FIG. 9 taken along lines 10-10 of FIG. 9.

FIG. 9 shows another embodiment of the invention wherein a fluorescent tube 120 includes an enclosed chamber 122 housing a plurality of LEDs 124. Chamber 122 preferably forms an elongated cylinder extending the length of the tube 120 for separating the LEDs 124 from the gases within the fluorescent tube. The LEDs 124 are connected together by wires 126 and are connected to the electrodes 128 of the tube 120.

FIG. 10 is a cross-sectional view taken along lines 10-10 of FIG. 9 showing the chamber 122 in a concentric relationship to the fluorescent tube 120. It should be understood that the chamber 122 could be offset. The electrode 130 of the fluorescent tube 120 is shown as modified to be formed about and spaced from the chamber 122.

While this invention has been described as having a preferred design, it is understood that it is capable of further modifications, uses and/or adaptations of the invention following in general the principle of the invention and including such departures from the present disclosure as come within the known or customary practice in the art to which the present invention pertains and as maybe applied to the central features hereinbefore set forth, and fall within the scope of the invention and the limits of the appended claims.

The invention claimed is:

1. A light assembly comprising:
   a) a fluorescent tube containing a light emitting gas, said tube having spaced apart ends, each of said ends having electrical connectors for connecting said tube to an electric power source,
   b) an LED located within said tube and said LED being electrically connected to said electrical connectors.

2. The light assembly as set forth in claim 1, wherein;
   a) said LED is separated from said light emitting gas by a transparent housing.

3. The light assembly as set forth in claim 2 wherein;
   a) said transparent housing extends the entire length of said tube.

4. The light assembly as set forth in claim 3 wherein;
   a) said transparent housing is concentric with said tube.

5. A light assembly comprising:
   a) a fluorescent tube containing a light emitting gas, said tube having spaced apart ends, each of said ends having electrical connectors for connecting said tube to an electric power source,
   b) a circuit board having at least one LED is mounted on said tube.

6. The light assembly as set forth in claim 5, wherein;
   a) said circuit board is connect to a second electric power source.

7. The light assembly as set forth in claim 6, wherein;
a) said second power source is controlled by a signal circuit to operate said circuit board independently of said fluorescent tube.
8. The light assembly as set forth in claim 5, wherein;
a) said circuit board is removably connected to said tube so that said circuit board may be reused when said fluorescent tube is replaced.
9. A light assembly comprising:
a) a fluorescent tube containing a light emitting gas, said tube having spaced apart ends, each of said ends having electrical connectors for connecting said tube to an electric power source,
b) a support mounted to said fluorescent tube;
c) at least one LED mounted on said support;
d) said support having an electrical connector for supplying electric power from a power source to said at least one LED; wherein, said support is removable from said tube so that said at least one LED may be reconnected when said fluorescent tube is replaced.
10. The light assembly of claim 9, wherein;
a) said power source is controlled by a signal circuit to operate said at least one LED independently of said fluorescent tube.
11. The light assembly of claim 9, wherein;
a) a plurality of LEDs are mounted on said support and said LEDs are different colors.
12. The light assembly of claim 11, wherein;
a) said power source is controlled by a signal circuit to operate said plurality of LEDs independently of said fluorescent tube and independently of each other LED.
13. A light assembly comprising:
a) a fluorescent tube containing a light emitting gas, said tube having spaced apart ends, each of said ends having electrical connectors for connecting said tube to an electric power source;
b) a first clip mounted on said fluorescent tube, wherein said first clip has an inner surface substantially conforming to the outer surface of said fluorescent tube;
c) at least one LED mounted on said first clip;
d) said LED having an electrical connector in electrical communication therewith for supplying electric power from a power source to said at least one LED.
14. The light assembly of claim 9, wherein said at least one LED is altered to communicate a signal to users in an emergency situation such as fire, weather warning, building lockdown, bomb threat or terrorist threat.
15. The light assembly of claim 14, wherein said at least one LED is altered to a plurality of different states, each state being to selected to communicate a different threat selected from fire, weather warning, environmental hazard, building lockdown, bomb threat and terrorist threat.
16. The light assembly of claim 13, wherein:
e) said first clip is removable from said tube so that said at least one LED may be reconnected when said fluorescent tube is replaced.
17. The light assembly of claim 13, wherein:
e) said power source is controlled by a signal circuit to operate said at least one LED independently from said fluorescent tube.
18. The light assembly of claim 13, wherein:
e) a plurality of LEDs are mounted on said first clip and said LEDs are capable of displaying different colors.
19. The light assembly of claim 13, further comprising:
e) a second clip mounted on said fluorescent tube spaced apart from said first clip, wherein said clip has an inner surface substantially conforming to the outer surface of said fluorescent tube; and
f) a circuit board mounted on said first and second clip, wherein said at least one LED is mounted on said circuit board on said first and second clips.
20. The light assembly of claim 13, wherein said first clip is substantially arcuate.
21. The light assembly of claim 19, wherein a plurality of LEDs are mounted about the circumference of said first arcuate clip.

* * * * *